United States Patent [19]

Chainani et al.

[11] Patent Number: 5,697,829
[45] Date of Patent: Dec. 16, 1997

[54] PROGRAMMABLE TOY

[75] Inventors: Devindra S. Chainani, Bellevue; Timothy E. Wood, Seattle, both of Wash.

[73] Assignee: Microsoft Corporation, Redmond, Wash.

[21] Appl. No.: 548,910

[22] Filed: Oct. 26, 1995

Related U.S. Application Data

[62] Division of Ser. No. 384,034, Feb. 6, 1995.

[51] Int. Cl.$^6$ .................................................. A63H 17/00
[52] U.S. Cl. ........................ 446/436; 364/423.098; 364/410; 434/118; 901/1; 395/80; 318/568.12
[58] Field of Search .......................... 446/436, 454, 446/455, 456, 484, 491, 175; 901/1; 364/423.098, 410; 434/118; 395/80; 318/568.12

[56] References Cited

U.S. PATENT DOCUMENTS

| H1469 | 8/1995 | Simonoff | 446/454 X |
|---|---|---|---|
| 4,548,584 | 10/1985 | Townsend | 446/454 X |
| 4,654,659 | 3/1987 | Kubo . | |
| 4,712,184 | 12/1987 | Haugerud | 446/95 X |
| 4,828,525 | 5/1989 | Okano | 446/455 X |
| 4,964,837 | 10/1990 | Collier . | |
| 5,031,109 | 7/1991 | Gloton | 901/1 X |
| 5,083,968 | 1/1992 | Hart | 901/1 X |
| 5,209,695 | 5/1993 | Rothschild . | |

FOREIGN PATENT DOCUMENTS 2278064  11/1994  United Kingdom ............ 446/456

OTHER PUBLICATIONS

Ciarcia, A Computer-Controlled Tank, BYTE, vol. 6, No. 2, Feb. 1981, p. 44.

*Primary Examiner*—Jessica Harrison
*Assistant Examiner*—Michael O'Neill
*Attorney, Agent, or Firm*—Ronald M. Anderson

[57] ABSTRACT

A control program for a programmable toy (24) is created using a graphic programming system implemented on a personal computer (10). In the preferred embodiment, the programmable toy comprises a vehicle that can be commanded to make turns in 45° increments and to track an infrared source (220). To create the graphic control program, the user simply selects graphic objects from control panel (154) presented on a cartoon-like graphic screen. For example, the user can select a horn graphic object (168) or a headlight graphic object (166) to respectively activate a horn or headlights on the programmable toy. The user creates a graphic control program on a grid (160) using a mouse (23) to select the graphic objects and indicate parameters. Once the graphic control program is completed, it is downloaded from the RS-232 serial port of the personal computer into the programmable toy through a connecting link (25), which is then uncoupled from the programmable toy. A switch (29) on the toy activates the control program. Also included in the system is a calibration template (200) for calibrating the programmable toy to turn accurately on a specific surface.

18 Claims, 7 Drawing Sheets

FIG. 3

PROGRAMMABLE TOY

This application is a divisional application based on prior copending application Ser. No. 08/384,034 (now pending), filed on Feb. 6, 1995, the benefit of the filing date of which is hereby claimed under 35 U.S.C §120.

FIELD OF THE INVENTION

The present invention generally relates to a method for controlling electrically actuated toys, and more specifically, to a method for producing a program used by a controller to control the manner in which the toy is actuated.

BACKGROUND OF THE INVENTION

Remotely controlled toys are very popular with children, because they allow the child to directly control the action and movement of the toy. Such toys are usually either coupled to a hand-held controller by a conductive lead or tether, or respond to radio signals transmitted by a controller. Battery driven electrical motors typically provide the power to move action toys of this type. Other action toys include onboard controls, ranging from a simple on/off switch to a keypad on which a series of program steps are entered into a memory for subsequent execution by the toy. Other battery powered toys move in ways predetermined by their design and construction, without the option for the child to significantly vary the pattern of movement.

Toys that are controlled through electrical tether lines are thereby limited in their range of motion. Ideally, a toy should be able to operate without being coupled to a hand control unit through a tether line. Radio controlled toys provide greater versatility, but require that the child constantly interact with the transmitter to control the toy's movement, its direction, and speed. Younger children can have difficulty controlling such a toy in this manner because they may not possess sufficient manual dexterity and hand-eye coordination. Toys that include a programmable controller, which can be programmed by the child, overcome this problem. One such toy, which is distributed by Milton Bradley, is called BIG TRAK; it includes a keypad on which up to sixteen program steps can be entered to direct the tank-like toy to move forward or backward, turn right or left by a defined angle, pause, and fire its "photon canon." Although the keyboard is relatively simple in layout, there is no provision for displaying successive steps as they are entered, and a child can easily loose track of the steps so that the toy does not perform as intended.

Any provision for programming a toy must be at a level that enables the average child to readily master the technique. Clearly, if the programming skills required are too difficult to acquire, the child will become frustrated with the toy and be unable to create programs that can be used to control it. Unfortunately, most microcontrollers are too simple and have memory and processing resources too limited to support a high level programming language. Instead, they execute simple control instructions that are stored in random access memory (RAM), in accordance with a machine language program that is normally stored in read only memory (ROM). Unless the user-selected control options are entered on a dedicated keypad using direction arrows and other simplifying control keys like those used by the BIG TRAK, it would unreasonable to expect a child to program a toy microcontroller. Developing a machine language program is clearly far beyond the skills of most adults and totally impractical for children in the age range from 8 to 12 years.

Toys have been developed that can be controlled by a user with a conventional personal computer. In most instances, the personal computer is linked to a microcontroller within the toy by a data line tether over which instructions are passed from the personal computer to control the toy. The user typically develops the machine instructions on the personal computer, using a line editor to make changes as required. Unfortunately, the required connection of the toy to the personal computer by the data line tether fails to solve the problem noted above. In essence, the personal computer is simply a more expensive, although more capable, hand controller. Even if the data line linking the personal computer to a toy were used to download a control program developed on the personal computer into memory within the toy, the programming skill required to develop the controlling program would be beyond that of the average child. Currently, no prior art solution to this problem is available. A method that would enable children to prepare control programs for a toy on a personal computer would have significant educational value and encourage development of programming skills. Such an approach should be suitable for use with both commercially fabricated toys and with toys built by children. For example, a construction set such as LEGO™ building blocks, which include motors, sensors, and other electrically accessories, could be used to build an almost unlimited variety of toys that would be controlled based on a program developed by a child.

SUMMARY OF THE INVENTION

In accordance with the present invention, a method is defined for programming a toy using a graphical program created by a user of the toy. The method includes the steps of displaying a plurality of graphic objects to the user on a computer display, thereby enabling the user to select at least one graphic object from the plurality of graphic objects that corresponds to any portions of the toy that are to be controlled. A plurality of parameters for the graphic object are displayed so that the user can select specific parameters to apply to the graphic object(s) selected. Similarly, a plurality of graphic program blocks are displayed to the user. The graphic program blocks represent different corresponding components of control programs for the toy. From these graphic program blocks, the user is enabled to select specific graphic program blocks for inclusion in the graphical program being created. The graphical program created by the user is converted into a control program that is in a format executable by a control within the toy. A memory for the control within the toy is linked to the computer, and the control program is downloaded from the computer into the memory. The internal control is thereby enabled to determine functions performed by the toy in accordance with the control program created by the user.

A further step in the method is enabling the user to assign selected graphic objects and selected properties to the program blocks selected by the user. Preferably, the portions of the toy represented by the plurality of graphic objects include an electrical load associated with the toy. In the preferred embodiment, the portions of the toy represented by the plurality of graphic objects also include a sensor associated with the toy. The program blocks are thus selected by the user so as to define a desired control action response of the graphic object(s) selected to a signal produced by the sensor.

The step of converting comprises the step of compiling the graphical program into a machine code that is executable by a processor that controls the toy. The functions represented by the plurality of graphic programming blocks include Boolean operator functions. Preferably, the graphical program is editable in both a graphic format and in a textual format.

Another aspect of the present invention is directed to a graphic programming system for developing a control program to control a programmable toy. The graphic programming system is adapted to run on a computer under a graphic user interface and includes functional components that operate in a manner generally consistent with the steps of the method discussed above.

Yet another aspect of the present invention is a programmable toy adapted to be programmed with a control program that is based upon a graphical program developed on a computer. The programmable toy includes a body in which is disposed a first prime mover. The first prime mover is coupled to a portion of the toy that is movable relative to the body, and the portion is movably driven by the first prime mover. A processor is electrically coupled to the first prime mover to control its operation. Means are included for removably electrically coupling the processor to the computer to download a control program developed on the computer. The means for removably coupling are decoupled from the processor after the control program is downloaded. A power supply for the programmable toy supplies electrical power to the first prime mover and to the processor. A memory associated with the processor stores the control program as it is downloaded from the computer through the means for removably electrically coupling. The processor responds to the control program stored in the memory to effect control of the first prime mover of the programmable toy, enabling the programmable toy to operate independently of the computer.

In the preferred embodiment of the invention, the programmable toy comprises a vehicle having a plurality of wheels. The wheels comprise the portion of the toy that is movable. In addition, the first prime mover comprises an electric motor that drivingly rotates at least one of the plurality of wheels to move the vehicle in a plurality of the different directions, under the control of the processor.

The programmable toy further comprises a figure disposed inside the vehicle. A portion of the figure is movable, and an actuator moves the portion of the figure. This actuator is coupled to the processor and controlled thereby in accordance with the control program. Also included is a sensor; the sensor produces signals that are input to the processor. This processor controls the electric motor in response to the signals, in accordance with the control program. An energy transmitter is provided, which radiates energy in a vicinity of the vehicle. The sensor comprises a corresponding receiver of energy from the transmitter that produces the signals supplied to the processor. In response, the processor controls the electric motor so that the vehicle moves toward the energy transmitter. The vehicle also includes at least one collision sensing switch that produces a signal input to the processor to indicate when the vehicle has contacted an object with sufficient force to actuate the collision switch. The user can program an appropriate response.

A sound transducer associated with the toy preferably produces sound. The processor controls the sound transducer in response to the control program. Also included is a sound sensor and means for recording a signal produced by the sound sensor for playback through the sound transducer.

In the preferred form of the invention, the power supply comprises a battery. The programmable toy preferably includes a battery charge condition sensor that determines a battery voltage level of the battery and produces an output signal indicative of the battery voltage level for input to the processor. When next coupled to the vehicle, the computer on which the graphic programming system runs preferably sends a charge status signal that indicates the battery voltage level.

Yet another element that may be associated with the programmable toy is a light source. The light source is electrically coupled to the power supply to produce light while the programmable toy is operating.

The preferred embodiment also includes a second prime mover that is mechanically coupled to a different portion of the programmable toy than the first prime mover. The second prime mover is used to move the different portion of the programmable toy relative to the body under the control of the processor, in accordance with the control program. Just as noted above, this preferred embodiment of the programmable toy comprises a vehicle having a plurality of rotatable wheels, and the first prime mover is coupled to drive at least one of the plurality of wheels to move the vehicle in a plurality of directions. Again, the programmable toy further comprises a figure disposed within the vehicle. Part of the figure is moved by the second prime mover under the control of the processor, and this part preferably represents a head of the figure.

BRIEF DESCRIPTION OF THE DRAWING FIGURES

The foregoing aspects and many of the attendant advantages of this invention will become more readily appreciated as the same becomes better understood by reference to the following detailed description, when taken in conjunction with the accompanying drawings, wherein.

DESCRIPTION OF THE PREFERRED EMBODIMENT

Figure 1:
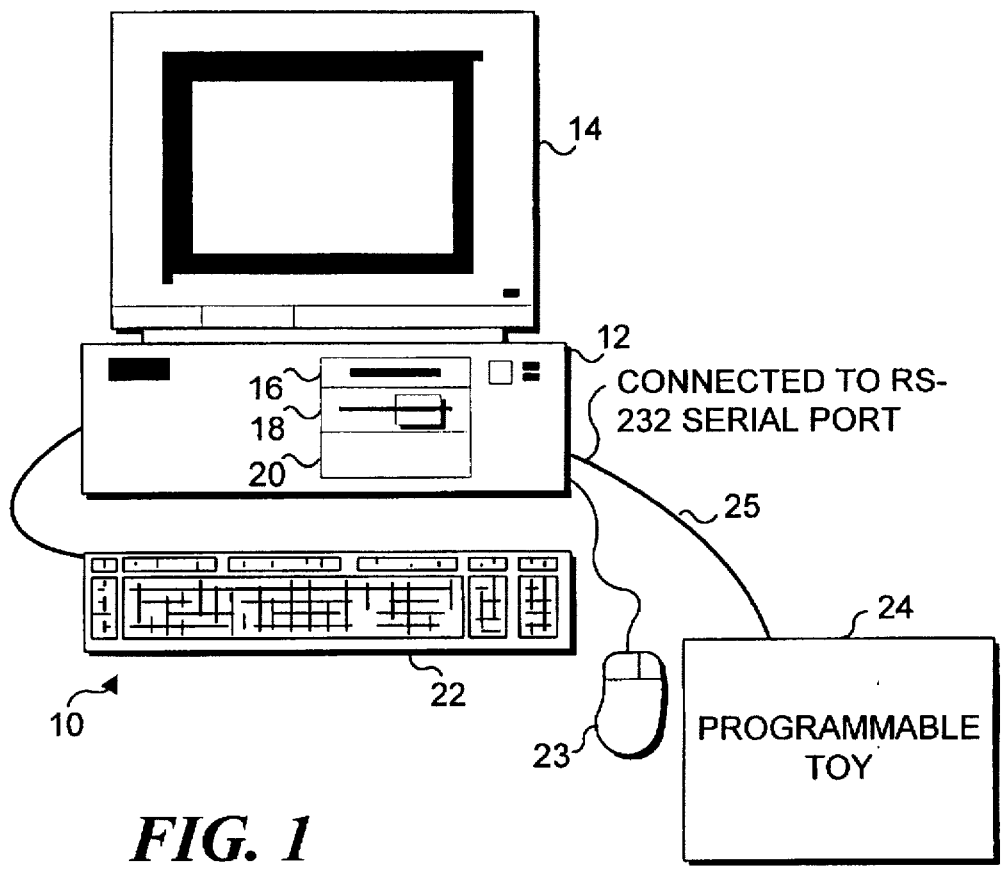
FIG. 1 is a schematic block diagram of a personal computer that is coupled to a programmable toy via a serial data link.

As shown in FIG. 1, a conventional desktop personal computer 10 can be employed to implement the present invention as described below. Personal computer 10 includes a desktop chassis 12. As those of ordinary skill in the art will understand, the components comprising the personal computer are disposed within desktop chassis 12 and generally include a central processing unit (CPU), a power supply, random access memory (RAM), read only memory (ROM), and other supporting circuitry, including an RS-232 serial port interface. Since these components are used in literally millions of personal computers and are very well known to those of ordinary skill in the art, they are not separately shown. Personal computer 10 also includes a monitor or display 14, floppy disk drives 16 and 18, and a hard disk 20. The floppy drives accept 3½-inch and 5¼-inch floppy disks, which provide non-volatile storage of data and executable files, enabling the files to be moved to and from other computers. Hard drive 20 is also used for non-volatile storage of executable files and data files, including the files required for the operating system that runs on personal computer 10. Although not shown, personal computer 10 may include a CD-ROM drive, enabling programs and data such as that embodying the present invention to be more readily load into and executed by the personal computer than would be possible using conventional floppy disks. It will be understood that the present invention can also be implemented on laptop computers and on workstations capable of running a graphic user interface operating system.

In the preferred embodiment, the graphic user interface is provided by an application program running on Microsoft WINDOWS™ operating system. It is contemplated that the present invention can be implemented on various types of computers running other graphic user interface operating systems, such as Apple Computer's SYSTEM 7™. The graphic user interface operating system is required so that graphic objects can be employed by a user to develop a graphic control program for a programmable toy 24. The graphic program is created by running an application program that executes under the graphic user interface operating system. Although the initial preferred embodiment of this application program is intended for use by children, it can also be used by adults and is readily modified to control almost any programmable device.

The user interacts with the application program running on personal computer 10 by keying input on a keyboard 22 or by selecting menu items, graphic objects, and other options using a mouse 23 (or other suitable pointing device). To transfer the control program from personal computer 10 to programmable toy 24, a link 25 temporarily couples the programmable toy to the RS-232 serial port of the personal computer. It is also contemplated that a parallel port interface on personal computer 10 (not shown) could also be employed for transferring a control program from personal computer 10 to programmable toy 24. Alternatively, an infrared link source (not shown) that is coupled to the personal computer and a suitable receiver (presently included, as discussed below) on the programmable toy could be used to transfer the program, or video signals presented on the display could be used to download the control program to a light sensor on the programmable toy (not shown — a known technique currently used to transfer data between a special wrist data watch and a personal computer display). Once the control program has been created by the user and downloaded from personal computer 10 to programmable toy 24 through link 25, the link is disconnected from the programmable toy, so that the programmable toy is not connected or tethered to personal computer 10. The programmable toy is thereafter controlled in accordance with the program steps of the control program developed by the user without any input from personal computer 10.

Figure 2:
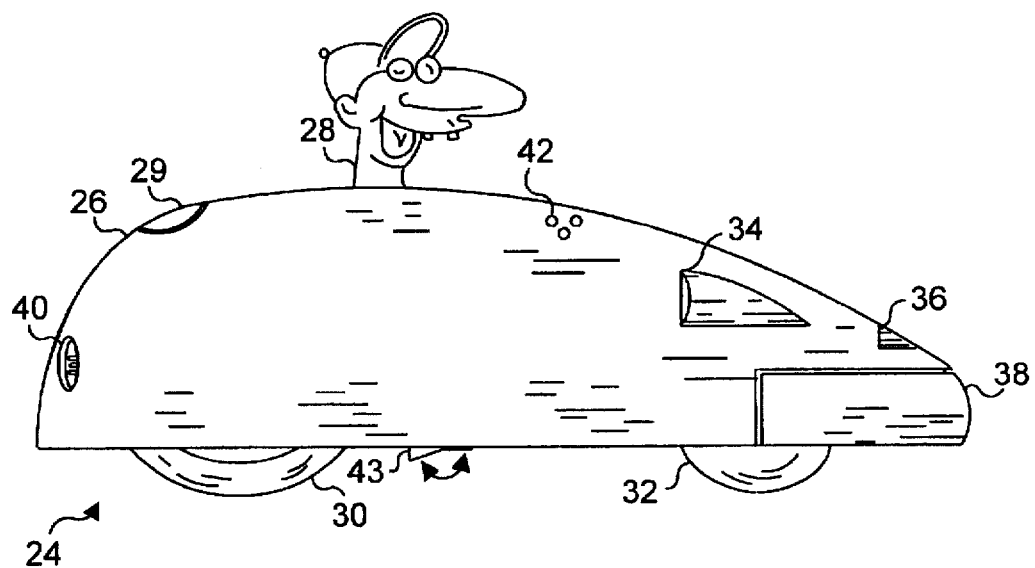
FIG. 2 is an elevational side view of a programmable toy that is controlled by a program created by a user with a graphic programming system in accordance with the present invention.

In FIG. 2, an exemplary preferred embodiment of programmable toy 24 is illustrated. In this embodiment, the programmable toy comprises a vehicle with an injection molded chassis 26, which has a generally tear-dropped shape. The programmable toy includes two wheels 30 that are mounted on independently driven axles (not shown). In FIG. 2, only one wheel 30 is shown; the other wheel is mounted directly opposite, on the other side of programmable toy 24. Wheels 30 can be selectively driven in opposite directions, enabling programmable toy 24 to turn about a point that is disposed midway between the two wheels. Under the front portion of the programmable toy is a hemispherical skid 32, which does not rotate. Instead, hemispherical skid 32 is formed of TEFLON™ plastic (or other plastic material such as DELRIN™ or NYLON™ having a relatively low coefficient of friction and abrasion resistance). Alternatively, hemispherical skid 32 can be replaced by a captive roller ball, or by a pivoting, freely rotatable wheel. Extending upwardly from the center of programmable toy 24 is a cartoon head 28. Head 28 is designed as a caricature of a cartoon-like character named "McZee." In this embodiment, head 28 can be selectively turned from side to side, when directed by the program controlling programmable toy 24.

A pair of headlamps 34 (only one shown in FIG. 2) are mounted within chassis 26 of the programmable toy, on each side, near the front of the toy. Forward of headlamps 34 on each side of the car are disposed openings 36 (only one shown in FIG. 2) giving access to infrared sensors that are mounted inside chassis 26 and thus not shown. A front bumper 38 is flexibly mounted on chassis 26 so that it deflects when programmable toy 24 collides with another object. Two collision switches (not separately shown in FIG. 2) are mounted inside chassis 26, coupled to front bumper 38, to sense a deflection of the bumper caused by the programmable toy colliding with an object to the left, directly ahead, or to the right of the vehicle's line of travel. If the bumper collides with an object head-on, both collision switches are actuated, while a collision on one side actuates only the collision switch on that side. The response of the programmable vehicle to a collision with an object is determined by the graphic control program entered by the user, as explained below.

At the rear of programmable toy 24 is disposed a receptacle 40, which is adapted to receive a mating connector (not separately shown) that is attached to the end of link 25. It is through receptacle 40 and link 25 that programmable toy 24 communicates with the RS-232 serial port of personal computer 10 when a control program is to be downloaded from the personal computer into the programmable toy. A push-button switch 29 is mounted in chassis 26, behind head 28, and enables the programmable toy to execute the control program that is downloaded from personal computer 10. To the rear, on the right side of the chassis 26 is disposed a sound port 42. A toggle switch 43, which is disposed on the bottom surface of the programmable vehicle, controls power to the internal components of the programmable toy.

Figure 3:
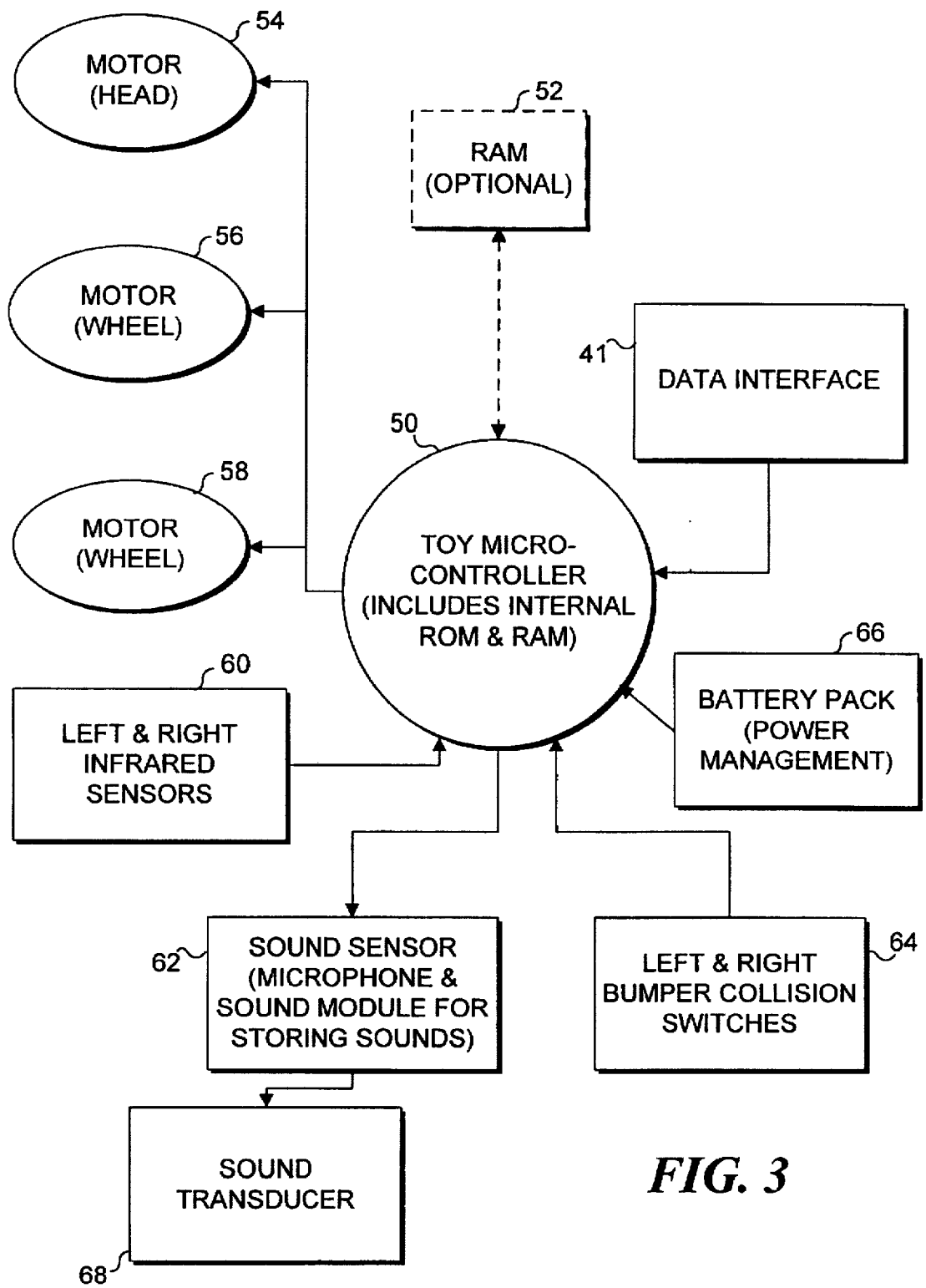
FIG. 3 is a schematic block diagram of the controller and other components of the programmable toy.

The internal components of programmable toy 24 and its controller are illustrated in a block diagram in FIG. 3. Programmable toy 24 is controlled by a microcontroller 50. In the preferred embodiment of programmable toy 24, a Motorola™ Type MC68HC05D9 microcontroller is used; however, it should be understood that many other types of microcontrollers could be used to control the components of the programmable toy. In this preferred embodiment, microcontroller 50 includes 16 Kbytes of ROM and 352 Bytes of RAM. The 16 Kbytes of ROM are used for storing a base operating program, which determines how components comprising the programmable toy are controlled by the user-supplied control program. The user-supplied control program is stored in the RAM of the microcontroller. Optionally, a RAM circuit 52 can be provided to increase the data storage capacity in the programmable toy. The format of the control program, which is typically in a machine language, is appropriate for controlling the particular microcontroller used in the programmable toy. A data interface 41, which is coupled to receptacle 40, serves as the input port for the microcontroller to receive the control program that is downloaded from the personal computer and stored in the RAM associated with the microcontroller.

Also coupled to microcontroller 50 are left and right infrared sensors 60, which as noted above, are used for detecting infrared light emitted by an infrared source 220 (shown in FIGS. 9A and 9B), so that programmable toy 24 can search for the infrared source. The signals produced by infrared sensors 60 are input to toy microcontroller 50, which is programmed to respond to changes in the signals that indicate on which side of the programmable toy the infrared source is located. The microcontroller will then respond by causing the programmable toy to turn toward the infrared source until the signals produced by the infrared sensors are approximately equal.

Also coupled to microcontroller 50 are a sound sensor 62, which is disposed behind sound port 42, and left and right collision switches 64, which are coupled to front bumper 38. Sound sensor 62 comprises a microphone and a sound module that includes an analog-to-digital converter (ADC) and a digital-to-analog converter (DAC) (none separately shown). The ADC in sound sensor 62 produces a digital signal corresponding to the analog sound picked up by sound sensor 62 from its ambient. The sound module in sound sensor 62 internally stores a few seconds of digitized sound for playback through a sound transducer 68 to which it is electrically coupled. In response to a command from the toy microcontroller, the digitized sound stored within the sound module is converted back to an analog signal by the DAC, and the analog signal is input to the sound transducer, which reproduces the sound that was recorded. The sound transducer is disposed under chassis 26 and in addition to playing back the recorded sounds stored by the sound module, also produces other sounds in response to predefined sounds supplied by the sound module, such as the "beep" of a horn.

Left and right collision switches 64 are actuated by front bumper 38 striking an object. Displacement of front bumper 38 causes the left or right (or both) collision switches 64 to produce (or affect) an electrical signal indicating that programmable toy 24 has collided with an object in its path. Microcontroller 50 responds to the signal produced by one or both of the collision switches in determining the direction in which the programmable toy was moving when it collided with the object. The user decides how the programmable toy will respond to a head-on, left, or right collision. For example, if the signals from both collision switches indicate a head-on collision with an object, the user may have programmed the programmable toy to back up and turn toward the left. Alternatively, other functions or components, such as sound transducer 68, may be controlled to respond to a collision, e.g., by producing a sound of a honking horn.

A battery pack 66 comprising six nickel cadmium batteries is coupled to the microcontroller (and to each of the other components within the programmable toy that require electrical power). Not shown is a charge circuit into which the battery pack is plugged for recharging after its removal from the vehicle. The charge circuit draws power from the AC line to recharge the battery pack. It is also contemplated that a separate receptacle (not shown) could be provided to recharge the battery pack within the programmable toy using a DC signal at an appropriate voltage supplied by the external charge circuit. It is contemplated that the toy microcontroller will monitor the voltage of the battery pack and when next linked to personal computer 10, will selectively transfer or download a battery charge status signal indicative of the battery back voltage to the personal computer. By selectively calling up a battery charge status on the display, the user will know when the battery pack should be recharged.

Movement of programmable toy 24 is effected by actuating electric motors 54, 56, and 58. These motors can be selectively activated separately under the control of microcontroller 50. Motor 54 is coupled to head 28 on the toy to provide the driving force that pivots the head from side-to-side under the control of microcontroller 50 in response to the control program created by the user. Similarly, microcontroller 50 controls the application of power to motors 56 and 58, which provide the driving force to turn wheels 30. Motor 56 is coupled to left wheel 30 and motor 58 is coupled to right wheel 30. Each wheel can be independently actuated and the direction of rotation of each wheel can be independently controlled by microcontroller 50. The program stored in RAM the associated with the microcontroller (or in optional RAM 52) determines the conditions for controlling each of motors 54, 56, and 58, including the speed, direction of rotation, and duration of activation.

Figure 4:
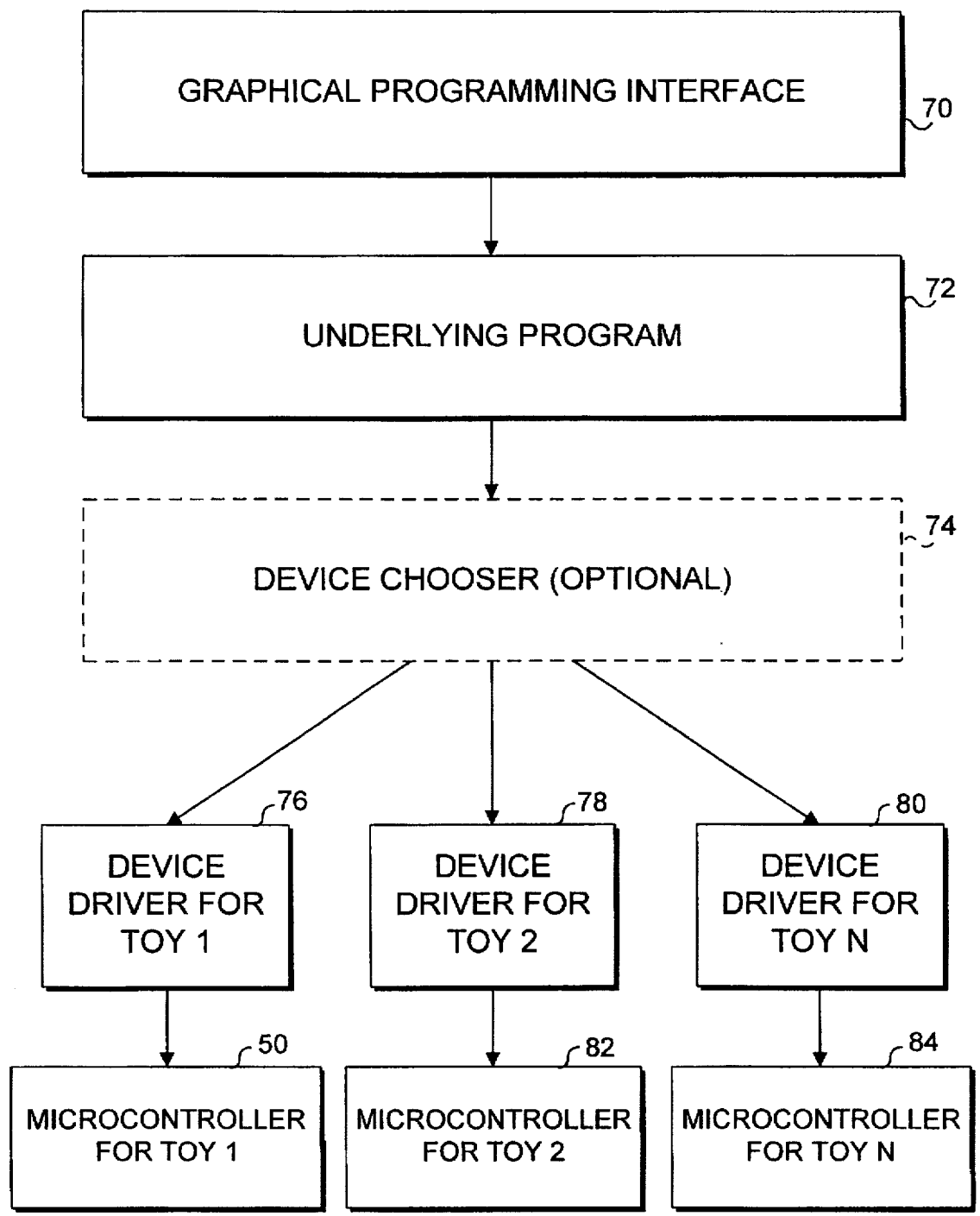
FIG. 4 is a block diagram that illustrates the functional components of the system used to develop the graphic control program and convert it to machine code in an appropriate format to control a selected programmable toy.

Referring now to FIG. 4, the paradigm under which the present invention operates is illustrated in a block diagram. This block diagram is directed to the more general case in which other types of programmable toys are available that are different than programmable toy 24 of the preferred embodiment.

One of the more important features of the present invention is its ability to produce a relatively complex control program for a toy without requiring that the user have any knowledge of the actual machine language code to which the microprocessor in the programmable toy responds. In fact, the user need not have any typing skill or any knowledge of computers or programming. As will be evident from the exemplary disclosure that follows below, the application to develop the control program, which runs under the graphic user interface operating system, greatly simplifies the task of specifying each step of a control program for a programmable toy or other programmable device. Because this program development application runs under the graphic user interface operating system, the user is essentially isolated from the intricacies of programming and typing lines of code. The user need only assemble selected graphic objects in a graphical programming interface 70, which is presented on the display screen. These graphic objects each represent different programmable functions of the programmable toy. Boolean operator functions (i.e., AND, OR, XOR) can be used to link the graphic objects, producing even more complex graphic control programs. For example, the graphic control program may provide that if a collision occurs, the programmable toy should honk a horn AND turn right 90°. A library of graphic control programs can be created and stored. Although the present preferred embodiment of the invention does not permit graphic programs to be combined, future versions are expected to permit the user to load two or more graphic control programs from a library and combine them into one program. It is also contemplated that an operator will be able to specify a predefined number of repetitions of a graphic control program be implemented, or loop through a portion of the graphic program before completing the rest of the program. It will therefore be apparent that almost any program feature normally available in text based control languages can be implemented in a graphic control program, in accordance with the present invention.

In the preferred embodiment, an underlying program 72 effects the graphical programming interface and handles the conversion of the graphical program developed by the user with that interface, to a format appropriate to drive the microprocessor in the programmable toy. The underlying program is the application that is loaded into the RAM of personal computer 10 from its hard drive when the user indicates that the graphic control program development system is to be run. In the preferred embodiment, the underlying program is written in Microsoft's VISUAL BASIC™ programming language, but it is likely that the underlying program will subsequently be rewritten in the C++ programming language before it is commercially released.

It will be apparent that programmable toy 24 represents only one form that such a toy may take. It is contemplated that many other types of programmable toys or devices can be programmed using the present invention. For example, instead of moving on wheels 30, the programmable toy may travel on caterpillar treads. Moreover, the programmable toy need not be a vehicle. The present invention is applicable to controlling a robot-like toy having arms, legs, and other controllable components, such as grippers.

It should be apparent that the programmable device controlled by the graphic program is NOT limited to a toy. It is also possible to apply the present invention to programming utilitarian devices, such as security robots, or a programmable tool. Accordingly, it is contemplated that the underlying program may provide the user the option to select the device with which the graphical programming interface is to be employed, and in response, will load an appropriate graphical programming interface for that type of programmable toy. Based upon the type of device selected by the user, an optional device chooser 74 selects the appropriate driver for translation of the graphical program developed by the user into the appropriate format required by the device driver for the selected programmable device. However, if the present invention is only used with a single programmable device, optional device chooser can be omitted. As a further alternative, the programmable toy (or other type of device) can be coupled to the personal computer before the underlying program is run, enabling the underlying program to query the programmable device to automatically determine the specific graphic programming interface and device driver that should be applied. If this alternative is employed, the user need not directly indicate the type of programmable toy or device to be controlled.

In the example shown in FIG. 4, there are a plurality of device drivers and different programmable toys shown, including a device driver 76 for Toy 1, a device driver 78 for Toy 2, and a device driver 80 for Toy N. Based upon the type of toy chosen by the user or automatically detected, device chooser 74 applies the appropriate device driver. Each device driver comprises a different dynamic link library file (i.e., a file with an extension DLL) that carries out the conversion from the graphical program developed under underlying program 72 to the appropriate machine code required by the selected microcontroller. Thus, device driver 76 converts the graphical program developed by the user to the appropriate machine code needed by microcontroller 50 in programmable toy 24. Similarly, device driver 78 carries out the appropriate conversion for a different type of toy or other programmable device controlled by a microcontroller 82; and in like manner, device driver 80 provides the necessary code for a microcontroller 84 in toy N. Each command or event in the graphic control program that is created by the user is converted into corresponding microcode commands for the microcontroller in the selected programmable toy or device. These microcode commands are grouped according to the component or function of the programmable toy that is being controlled and are downloaded to the RAM in the programmable toy in that grouping. The first step in the conversion is typically to change the graphic object and parameters selected by the user into a call to a function, followed by the arguments of the function. The appropriate device driver maintains a table that translates the call into the required microcode executed by the programmable toy or device microcontroller in carrying out that function.

In the preferred embodiment, microcontroller 50 takes commands that are each 6 bytes in length, i.e., comprise a 6 byte packet. Since the commands are grouped by events, all of the 6 byte packets for the event "MAIN" are transmitted to the programmable toy RAM in one group. The first packet for the group will be a "Start of MAIN" message. The next packet of the group might be "LEFT COLLISION" indicating the series of commands that the programmable toy should execute after the left side of the toy collides with an object. This process continues until an "End of Transmission" packet is sent.

The first byte of the six bytes in a packet is the number 2, which "Starts Transmission" of a microcode command to the programmable toy memory. The next two bytes of the packet are ASCII numbers representing the command or event to be implemented. Thus, for every command that the programmable toy can execute or event to which it can respond, there is a corresponding two digit ASCII code. For example, the command "MOVE" is number 65, "SPEAK" is number 70, etc. The next two bytes of the packet convey the parameters or arguments of the command. The final byte in a packet is the number 3, which indicates "end of transmission" of the microcode command. If a command and its parameters or arguments do not require all 6 bytes, the remainder of the packet is padded with the code for "spaces" (ASCII code 20).

Figure 5:
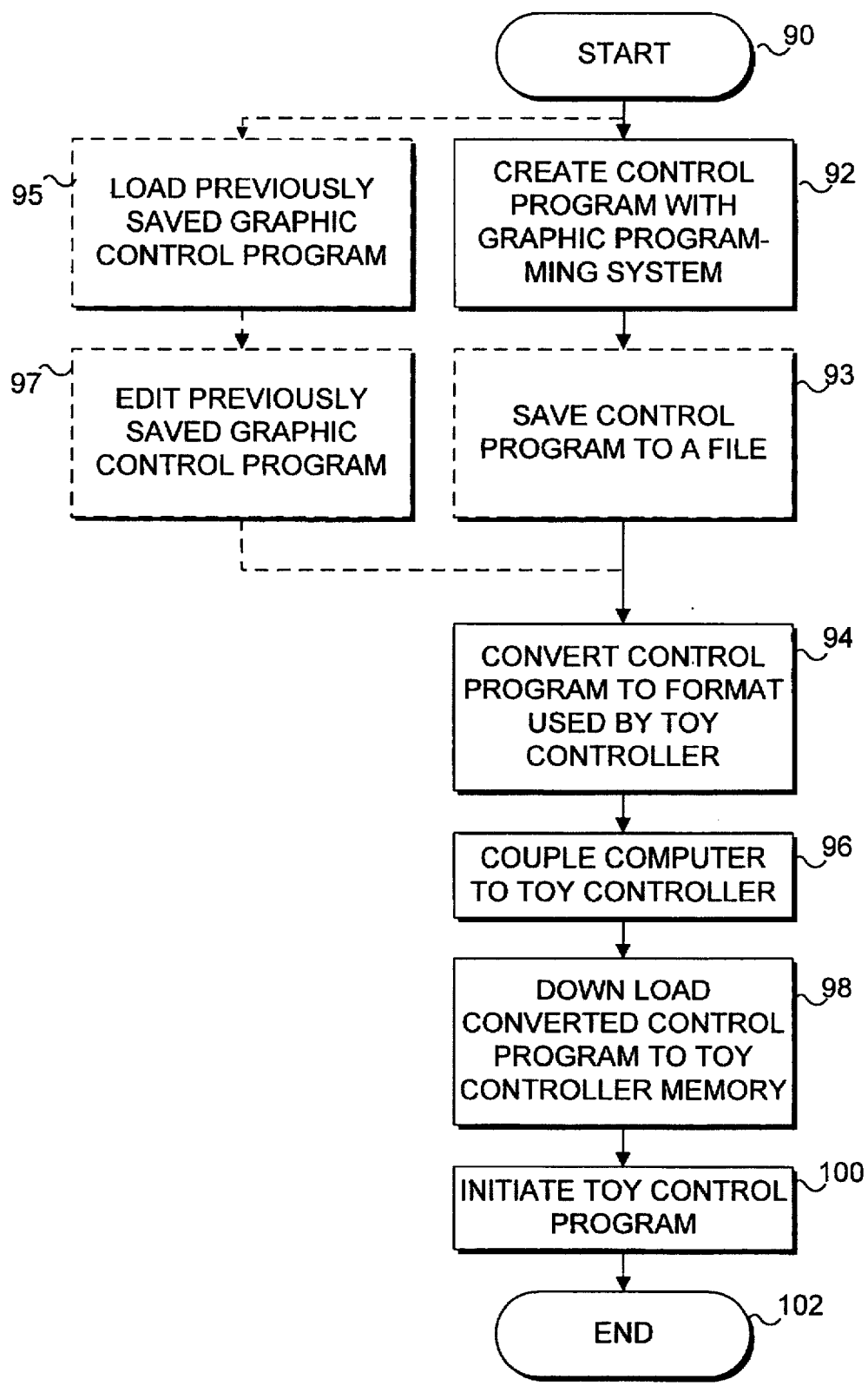
FIG. 5 is a flow chart showing the logical steps implemented in producing a control program for a programmable toy in accordance with the present invention.

Details of the steps implemented by a user in creating a graphical program that is then converted to the appropriate microcode used by the microcontroller in the programmable toy or device are shown in a flow chart in FIG. 5. Beginning at a start block 90, the logic proceeds to a block 92 in which the user creates a control program for the programmable toy or device with the graphic interface programming system. The graphic interface programming system is simply an application that runs under the graphic user operating system, enabling the user to define the commands to be executed and the response of the programmable toy to a specified event by selecting graphic objects that are presented to the user on display 14 (FIG. 1). This application runs when personal computer 10 executes program instructions that are loaded into RAM within the personal computer from an executable file stored on the hard drive (or on a floppy disk). The current preferred embodiment of underlying program 72 in which the graphic programming system is effected is written in Visual Basic. However, it is contemplated that later versions of the underlying program will be written in C++.

The steps required of the user for creating a control program with the graphic programmable system are illustrated in the example presented below. Generally, from the displayed graphics, the user selects graphic objects that represent commands or events with the cursor controlled by mouse 23. Each graphic object that is selected constitutes an additional command or event in the graphic control program. In addition, the user selects other graphic objects to set parameters or arguments that indicate how the programmable toy should move and react to objects in its environment. A block 93 optionally enables the user to save the graphics program so that it can later be loaded and/or edited. When saved, the graphic control program is converted to a text-based format. If the user has previously saved a graphic control program, from start block 95, the user may proceed to a block 95, in which the previously saved graphic control program is loaded from the hard drive as a text file and converted into a corresponding graphic format. Then, as noted in a block 97, the user can optionally edit the previously created graphic program.

A block 94 provides for converting the graphic control program developed by the user in the graphic programming system into the appropriate format required by the toy microprocessor controller. This step involves the selection of the device driver for the particular programmable toy chosen by the user or automatically identified when connected to the personal computer. Conversion of the control program is entirely transparent to the user and produces a file that can be saved on the hard drive in which each of the graphic program steps are converted into corresponding machine code or microcode that will cause the microcontroller within the programmable toy to implement the function selected by the user. This conversion is applied to each of the program commands and events selected by the user to generate a machine language program, with packets in the required byte size and format.

In a block 96, the user couples the personal computer to the controller in the toy, for example, through the RS-232 serial port using link 25, as shown in FIG. 1. When commanded by the user, the personal computer transfers the machine language program created by the conversion in block 94 into the RAM within the programmable toy, as indicated in a block 98. After the converted control program is downloaded into the programmable toy memory, a block 100 provides for initiating the toy control program. This step is typically effected when the user actuates push-button switch 29 on the programmable toy. The programmable toy then executes the control program until it is terminated by deactivating the programmable toy with push-button switch 29, or until the control program concludes. A block 102 terminates the logic shown in FIG. 5.

An Example of Graphic Programming Interface

Figure 6:
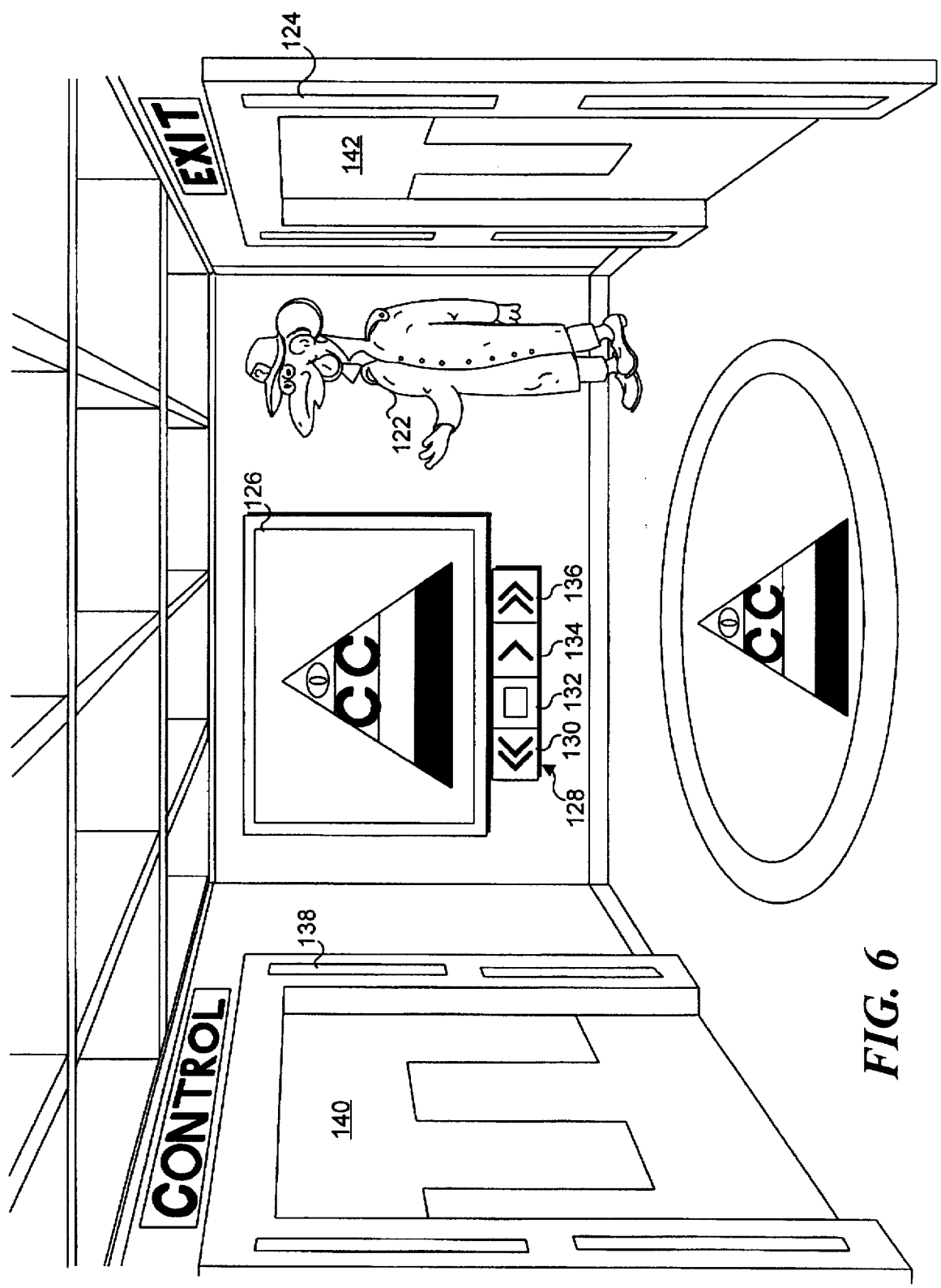
FIG. 6 illustrates an exemplary cartoon-like display screen for the initial preferred embodiment of the graphic programming system.

With reference to FIG. 6, an opening display screen used in the preferred embodiment for the graphic programming system is illustrated. It should be noted that this display screen is but one example illustrating how a user can be introduced to the concept of creating a graphic program to control a programmable toy or device. It should be apparent that many other approaches can be used to capture the interest of a child or an adult user and to introduce the user to the basic concepts involved in creating a graphic control program.

In FIG. 6, the screen displays a foyer or entrance to a control room. A cartoon character 122 called McZee makes the introductory remarks and provides help as required. When this application program is first executed by a user, it is likely that the user will find it helpful to run an informational tutorial. This tutorial is activated and displayed on a screen 126, disposed on the back wall of the foyer. Controls 128 enable the user to control the animated tutorial and stop it at any time. Specifically, a play button 134 starts the tutorial, after which, it can be stopped by activating a stop button 132. The user can also fast forward through the tutorial using a button 136, or rewind using a button 130. Although not presently implemented, McZee may suggest that the user first review the tutorial if the user attempts to exit the foyer without having entered the control cave. Since the present embodiment is intended to appeal to children, the tutorial is designed to engage the user in a "secret agent" scenario in which the user is directed to complete a secret mission by programming the "McZeebot" (i.e., programmable toy 24).

On the right side of the foyer is an exit framed by lighted bars 124. To proceed through the exit, the user clicks the mouse button while the cursor is anywhere on a door 142. Door 142 then opens, resulting in termination of the program. On the left side of the foyer is an entrance to the control cave framed by lighted bars 138. The user can progress through the entrance by clicking the mouse button while the cursor is anywhere on a door 140. When door 140 opens, the user is presented an initial view into the control cave; the application program then proceeds to the next graphic display screen, which is shown in FIG. 7.

Figure 7:
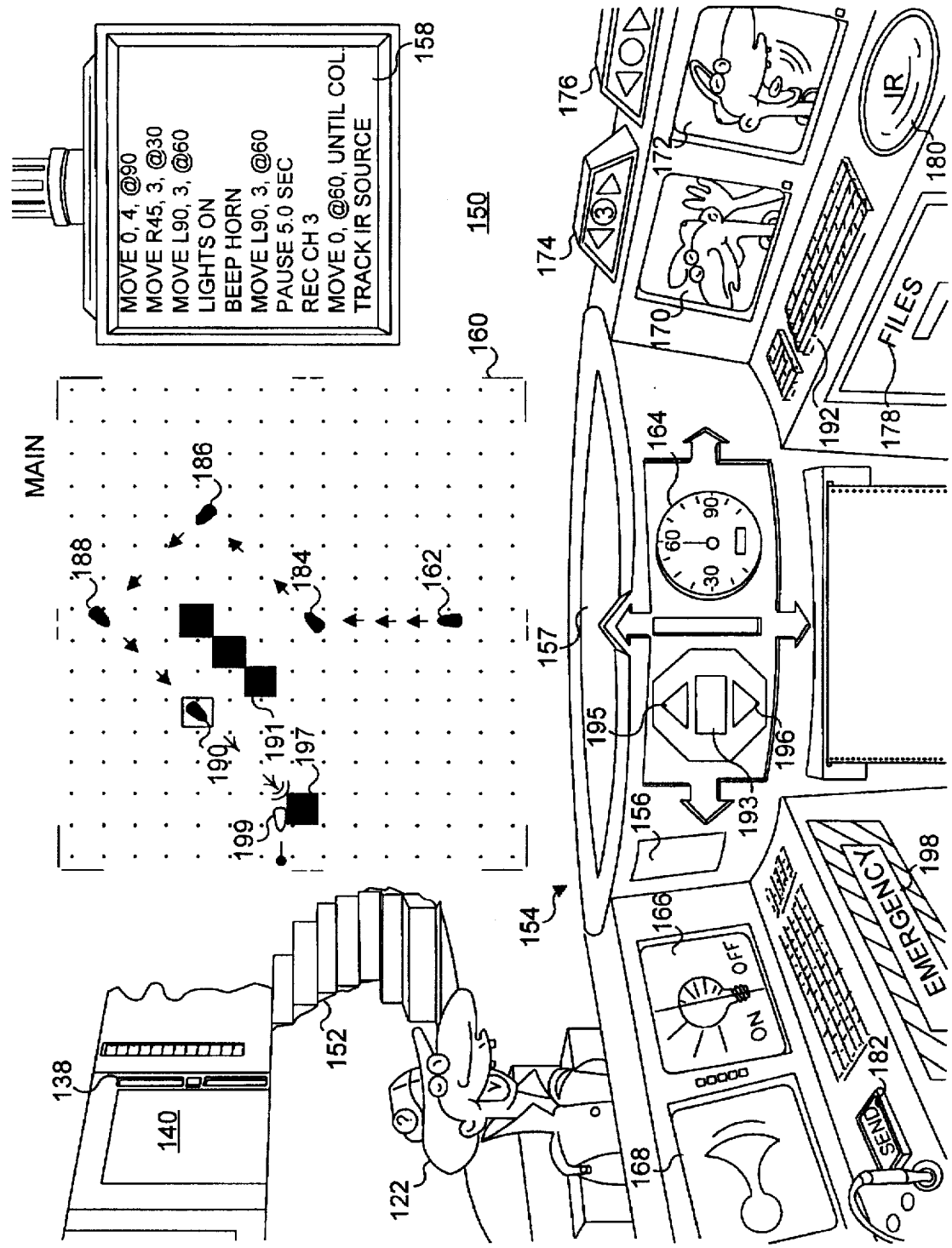
FIG. 7 illustrates an exemplary display screen showing a control console and the various graphic objects that the user can select in creating a graphic program to control the programmable toy.

After the user has opened door 140 to enter the control cave, a graphic control console 154 is presented on the display screen, generally as shown in FIG. 7. This black and white illustration does not capture the cave-like background, with dark shadows and rocky texture that is evident in the actual 256-color display. Again, McZee character 122 is present in the control cave to provide help to the child in creating a graphic control program for a programmable toy. For example, McZee initially tells the user to actuate a switch 156 in control console 154. When the switch is actuated or moved by the user with the mouse controlled cursor, a display panel 158 lowers from the ceiling of the control cave and a heads-up grid 160 appears above control console 154. All of the graphic objects on control console 154 then become active.

Because the programmable toy is a vehicle in this exemplary preferred embodiment, McZee character 122 instructs the user to click on a square on grid 160 with the mouse to select a starting position 162 for the toy. To command the programmable toy to move, the user clicks a speed on a speed gauge 164, thereby setting the speed of the programmable toy, and then clicks on another square on grid 160 to which the user wants the toy to move. In the series of graphically programmed moves shown on grid 160, the user has selected an initial speed of 90 and has indicated that the programmable toy should move from its starting position 162 to a first position 184, four units away, at a heading of 0°. Arrows indicate the movement on grid 160, and panel 158 indicates the corresponding text command with the phrase "Move 0, 4, @90."

From first position 184, the user has graphically indicated that the programmable toy is to make a 45° right turn and proceed three units, at a speed of 30, to a second position 186. At second position 186, the user has graphically commanded the programmable toy to move to a third position 188 by making a 90° left turn and proceeding three units at a speed of 60. At third position 188, the user has selected other graphic objects to control the programmable toy.

Control console 154 includes a light control graphic object 166, which is illustrated as a light bulb, the left side lighted and the right side dark. Each time that the left side of light control graphic object 166 is selected using the mouse controlled cursor, a graphic control program command is entered to turn on headlights 34 on the programmable toy (FIG. 2). Selecting the right side of the light control graphic object with the mouse cursor turns off the headlights. In the example, the user has toggled the headlights on at third position 188 by selecting the left side of light control graphic object 166.

Also provided on control panel 154 is a horn control graphic object 168 in which a horn is represented. By selecting horn control graphic object 168, the user causes a horn sound to be emitted from the programmable toy, using sound transducer 68 (shown in FIG. 3). Each of these programmable steps is indicated on panel 158. Finally, the user has graphically entered a program command to cause the toy to turn left 90° and move three units at a speed of 60 to a fourth position 190. Another graphic object (not shown) can be selected to turn McZee's head 28 (on the programmable toy shown in FIG. 2) left or right.

In the example illustrated on panel 158, the series of commands graphically entered by the user will manually control the toy to avoid an obstacle 191. The user has created obstacle 191 on grid 160 by clicking the right mouse button. The obstacle may represent a piece of furniture or a door about which the programmable toy must navigate. An alternative scheme for controlling the programmable toy is illustrated in connection with its motion after reaching fourth position 190. At fourth position 190, the programmable toy is graphically commanded to pause for five seconds. The user selects a Pause graphic control object 193 with the mouse cursor to enter the command causing the programmable toy to pause. The time of the pause is controlled by the user selecting an upward pointing arrow 195 to increase the duration or a downward pointing arrow 196 to decrease the duration. The pause duration is indicated within Pause graphic control object 193. In addition, at fourth position 190, the user has graphically commanded the programmable toy to record ambient sound that is picked up by sound sensor 62 (FIG. 3). To select this option, the user moves the cursor with the mouse until it is over a Record graphic object 170, which is an illustration of the McZee character apparently listening to something. From one to ten channels of sound can be selectively recorded using a Record channel selector graphic object 174 (which includes controls for incrementing or decrementing the channel number). Similarly, when the user wants the programmable toy to play back the recorded sound on a particular channel, the mouse cursor is moved over a Playback graphic object 172, which is an illustration of the McZee character speaking. The channel to be played back is selected with the mouse cursor by activating a Playback channel selector 176, which includes controls for incrementing or decrementing the channel.

To command the programmable toy to move from fourth position 190, the user has entered an obstacle 197 with the right mouse button and selected the obstacle with a mouse button click, thereby indicating that the user intends the programmable toy to proceed forward at its current 225° heading (or zero degrees relative, since the vehicle is not commanded to turn). In addition, the user has indicated that the speed should be 60. In response to either the left or right collision switches (or both) on the programmable toy sensing contact with the obstacle, the programmable toy is programmed to turn away from the obstacle at a 45° relative angle and maintain the same speed previously set. The path followed by the programmable toy when it is set to respond to a collision is indicated by an open head arrow in grid 160.

Following the collision with the next object encountered, the user has graphically programmed the programmable toy to track the IR source. To select this option, the user moves the cursor with the mouse to select an IR track button (graphic object) 180. When the toy is tracking the IR source, it follows a path that leads most directly toward the source. On grid 160, the nominal path is generally indicated by an "arrow" comprising a line having a bullet at one end.

At any time the user wishes to change the graphical program that has been developed, the corresponding text line that is to be changed is selected on panel 158 with the cursor. Once a line of the corresponding text program is selected, keyboard 22 (FIGURE) is used to make a change. Alternatively, the user can click on graphic objects to enter one or more new command line(s). If the user selects a graphic object 198, which is labeled "Emergency," the user can create separate graphic control programs to respond to "emergency event." For example, a response can be programmed that will define what the programmable toy should do if it cannot sense the IR source when it is commanded to track the source.

At any time the user wishes to save the current graphic program, the mouse controlled cursor can be used to select a file graphic icon 178, causing a file drawer to open and displaying graphic objects that enable the user to save the current graphic control program in a file and/or load a different graphic control program from a file for editing or downloading to the programmable toy. Once a graphic control program is thus saved, it can be called up in the future so that the user can make revisions to it or add additional commands with the graphic programming system.

Once a graphic control program has been completed to the user's satisfaction, it is typically downloaded into the memory of the programmable toy. To accomplish that step, the user selects a Send graphic object 182 on control panel 154, causing the appropriate programmable toy driver DLL file for the selected toy to be employed to convert the graphic control program into the microcode format required by the toy.

Calibration Template

Figure 8:
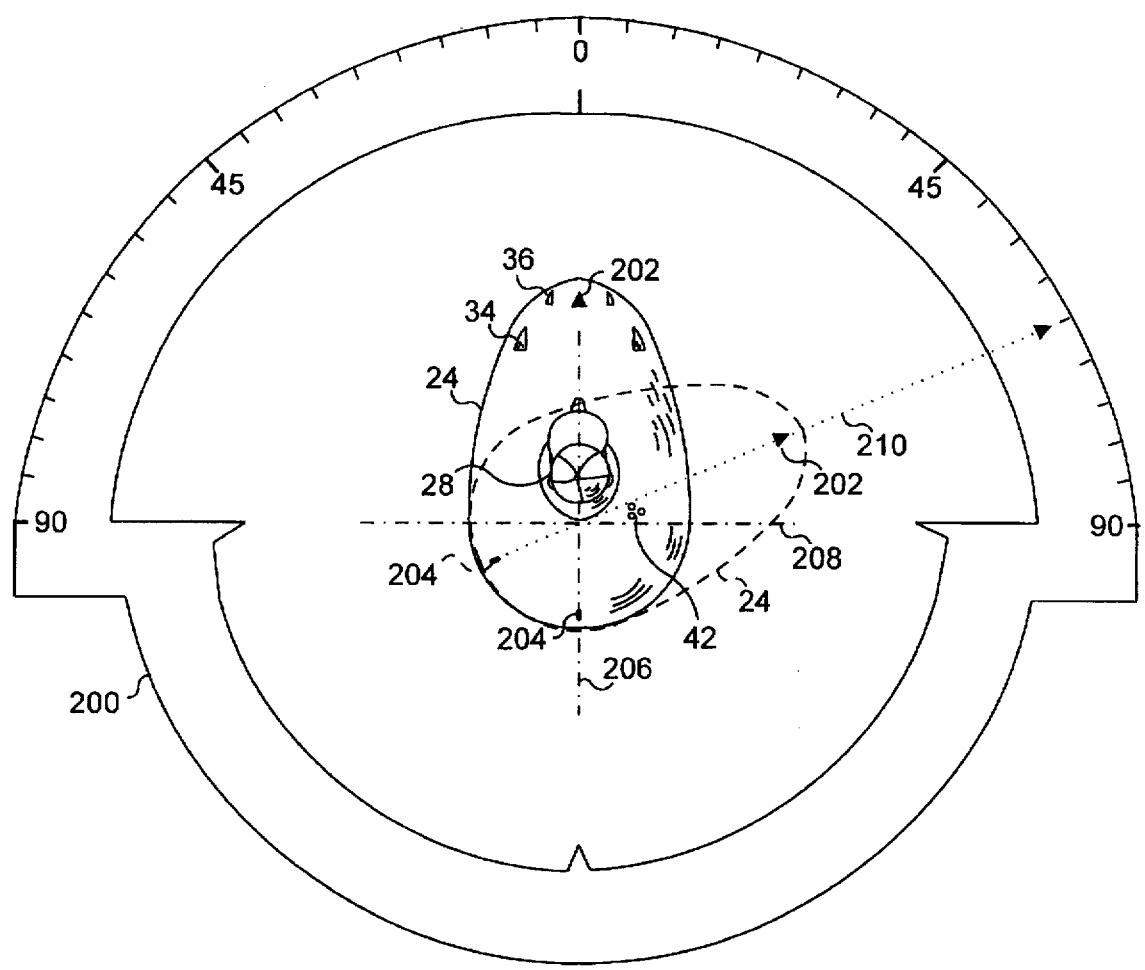
FIG. 8 is a schematic plan view of a turn calibration template for use in determining the turning angle of the programmable toy on a specific surface.

In the preferred embodiment, the programmable toy can be turned in increments of 45°. However, the surface upon which the toy is moving can dramatically affect the accuracy of the angle through which the programmable toy turns in response to a programmed command. Accordingly, the present invention is also provided with a template 200, shown in FIG. 8, for calibrating the angle through which the programmable toy turns in response to a Move command. As shown in FIG. 8, programmable toy 24 is placed within template 200 so that the centerline through wheels 30 is aligned with a line 208 that extends between the 90° marks on the left and right sides of the template, and so that the longitudinal center of the toy, marked by an arrow 202 disposed at the nose of the toy and a mark 204 disposed at the rear of the toy, is aligned along a zero axis 206 of the template. To use the template, the programmable toy is programmed for at least one turn of either 45° or 90°. The programmable toy and the template are positioned on the surface for which the turn is to be calibrated, generally as shown in the Figure. Clearly, if the surface is rough, such as a shag carpet, the toy will turn through an angle that is less than the programmed angle. The programmable toy is then activated, enabling the control program to execute the desired turn on the particular surface for which it is being calibrated.

In the example shown in FIG. 8, the toy has been programmed for a 90° right turn, causing it to turn so that its longitudinal axis lies along a line 210 that extends through approximately 65° on the template. The user must then enter the calibration information into the personal computer. Referring back to FIG. 7, the user selects a turn calibration object 157 on the top of the control console to indicate that a turn calibration point is to be entered for the programmable toy. In response, a graphic angle selector (not shown) will appear on the top surface of the control console, enabling the user to graphically indicate the angle of the turn originally programmed and the angle that the toy actually turned. Once the angle calibration data are graphically entered, the programmable toy will employ the calibration to modify the machine language microcode that controls the toy, causing it to turn to approximately the angle indicated by subsequent Move commands, by correcting for the additional friction of the surface on which the programmable toy was calibrated.

The same calibration can be repeated for multiple angles and for different surfaces, provided that the user identifies each surface on which the toy is running when creating the graphic control program to control the programmable toy. Each surface that is thus calibrated will be noted in a list that will appear on one side of grid 160. When the user selects a surface, a color (or texture) will be painted on the grid that corresponds to a graphic object associated with the surface in the list.

It is also contemplated that the programmable toy may include a turn angle sensor for determining the angle through which the programmable toy is turning in response to a programmed command. For example, if hemispherical skid 32, which is disposed under the front of the programmable toy, is replaced with a pivoting wheel that includes an angle sensor, the calibration will be unnecessary, since the angle sensor can continuously monitor and determine the effect of the surface on which the programmable toy is operating, enabling the toy microcontroller to continue turning the toy until the commanded angle is achieved. Angle sensors appropriate for this purpose are well known in the prior art and include variable resistors and photocells. Such devices are commonly used in mouse pointing devices to determine the distance that the pointing device is moved in a particular direction. Use of such an angle sensor on the programmable toy would allow the programmable toy to run on different surfaces, turning through the programmed angle, without concern for errors introduced by the varying coefficient of friction of the surfaces.

Infrared Source

Figure 9A:
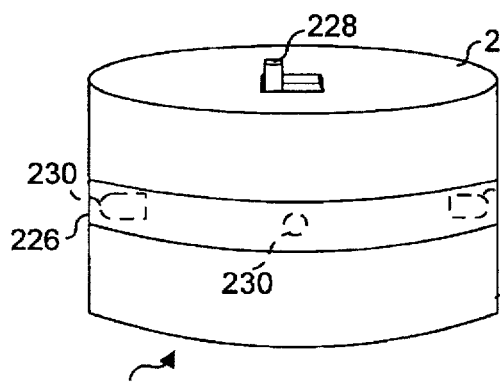
FIG. 9A is an isometric view of an infrared source that the programmable toy can be programmed to track.
Figure 9B:
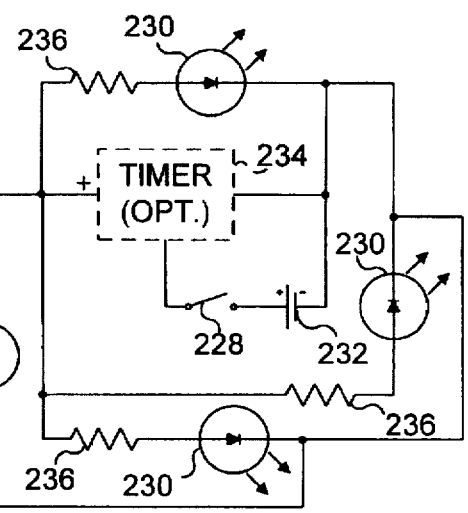
FIG. 9B is an electrical schematic diagram of the infrared source of FIG. 9A.

Referring to FIGS. 9A and 9B, an infrared source 220, which is used as a target, is illustrated. The physical configuration of the source is similar to that of a thick hockey puck, having a lower section 222 and an upper section 224 joined on opposite sides of a transparent center section or band 226. Mounted inside band 226 and facing radially outwardly at orthogonal positions are four infrared light emitting diodes (LEDs) 230. LEDs 230 are mounted inside band 226, so that infrared light emitted by the LEDs is diffused radially outward over a substantially 360° coverage around the periphery of infrared source 220. A switch 228 enables the user to energize the infrared source.

The internal circuitry of infrared source 220 is shown in FIG. 9B. As shown in this Figure, a timer 234 is optionally included in series with switch 228. A 9-volt battery 232 provides electrical power to energize infrared LEDs 230 when switch 228 is closed. Each LED 230 is connected in series with a resistor 236 to the output of optional timer 234. Optional timer 234 limits the time during which LEDs 230 are energized to a predefined interval, e.g., thirty minutes, to minimize drain on battery 232 in the event that switch 228 is inadvertently left in the closed position for an extended period of time. To reset the time interval and again activate the IR source, switch 228 is momentarily opened and then closed. This action reinitiates the timed interval during which the infrared LEDs are energized. If the optional timer is not used, the resistors are connected in parallel to switch 228.

Although the present invention has been described in connection with an exemplary preferred embodiment, it will be understood by those of ordinary skill in the art that many modifications can be made thereto within the scope of the claims that follow. Accordingly, it is not intended that the scope of the invention in any way be limited by the above description, but that it be determined entirely by reference to the claims that follow.

The invention in which an exclusive right is claimed is defined by the following:

1. A programmable toy adapted to be programmed with a control program that is based upon a graphical program developed on a computer, said programmable toy comprising:
   (a) a body in which is disposed a first prime mover, said first prime mover being coupled to move the body, and to move a component of the programmable toy relative to the body, said component not being used to move the body;
   (b) a processor that is electrically coupled to the first prime mover to control its operation;
   (c) means for enabling removably electrically coupling the processor to the computer to download a control program developed on the computer, said means also enabling removably decoupling the processor from the computer after the control program is downloaded;
   (d) a power supply for the programmable toy that supplies electrical power to the first prime mover and to the processor; and
   (e) a memory associated with the processor, for storing the control program as it is downloaded from the computer through said means for enabling, said processor responding to the control program stored in the memory to effect control of the first prime mover of the programmable toy after said processor has been decoupled from said computer so as to enable the programmable toy to operate independently of the computer.

2. The programmable toy of claim 1, wherein the programmable toy comprises a vehicle having a plurality of wheels, said wheels comprising a different portion of the toy that is movable, and wherein the first prime mover comprises an electric motor that drivingly rotates at least one of the plurality of the wheels to move the vehicle in a selected direction under the control of the processor.

3. The programmable toy of claim 2, further comprising a figure disposed on the vehicle, a portion of said figure comprising said component that is movable by the first prime mover.

4. The programmable toy of claim 2, further comprises a sensor, said sensor producing signals that are input to the processor, said processor controlling at least one of a plurality of components of the vehicle in response to said signals in accordance with the control program.

5. The programmable toy of claim 4, further comprising an energy transmitter that radiates energy in a vicinity of the vehicle, wherein the sensor comprises a corresponding receiver of any energy produced by the energy transmitter to produce said signals, said processor controlling the electric motor so that the vehicle moves toward the energy transmitter.

6. The programmable toy of claim 4, wherein said sensor comprises a collision switch, said collision switch being actuated when the vehicle collides with an object.

7. The programmable toy of claim 1, further comprising a sound transducer associated with the toy that produces sound, said processor controlling the sound transducer in response to the control program.

8. The programmable toy of claim 7, further comprising a sound sensor that is controllable by the processor to record sound ambient to the toy in response to the control program, said sound transducer also being controlled by the processor to subsequently play the sound that was recorded in response to the control program.

9. The programmable toy of claim 1, wherein the power supply comprises a battery, further comprising a battery charge condition sensor that determines a battery voltage level of the battery and produces an output signal indicative of the battery voltage level for input to the processor.

10. The programmable toy of claim 9, wherein the processor transfers a battery status signal to the computer when next coupled thereto.

11. The programmable toy of claim 1, further comprising a light source associated with the programmable toy, said light source being electrically coupled to the power supply to produce light.

12. The programmable toy of claim 1, further comprising a second prime mover mechanically coupled to a different portion of the programmable toy than the first prime mover, said second prime mover being used to move said different portion of the programmable toy relative to the body under the control of the processor, in accordance with the control program.

13. The programmable toy of claim 12, wherein the programmable toy comprises a vehicle having a plurality of rotatable wheels, said wheels comprising a portion of the programmable toy that is movable, and wherein the first prime mover is coupled to at least one of the plurality of wheels to move the vehicle in a plurality of directions, said programmable toy further comprising a figure disposed on the vehicle, said different portion of the programmable toy comprising a part of the figure that is moved by the second prime mover under the control of the processor.

14. The programmable toy of claim 13, wherein the part of the figure that is movable represents a head of the figure.

15. A programmable toy adapted to be programmed with a control program that is based upon a graphical program developed on a computer, said programmable toy comprising:

(a) a body in which is disposed a first prime mover, said first prime mover being coupled to a component that is movable relative to the body when driven by the first prime mover, but does not move the body;

(b) a processor that is electrically coupled to the first prime mover to control its operation;

(c) means for removably electrically coupling the processor to the computer to download a control program developed on the computer, said means for removably coupling being decoupled from the processor after the control program is downloaded;

(d) a power supply for the programmable toy that supplies electrical power to the first prime mover and to the processor;

(e) a memory associated with the processor, for storing the control program as it is downloaded from the computer through said means for removably electrically coupling, said processor responding to the control program stored in the memory to effect control of the first prime mover of the programmable toy, enabling the programmable toy to operate independently of the computer; and (f) a sound sensor that is controllable by the processor to record sound ambient to the toy in response to the control program.

16. The programmable toy of claim 15, further comprising a sound transducer associated with the toy that produces sound, said sound transducer being controlled by the processor to subsequently play the sound that was recorded in response to the control program.

17. A programmable toy adapted to be programmed with a control program that is based upon a graphical program developed on a computer, said programmable toy comprising:

(a) a body in which is disposed a first prime mover, said first prime mover being coupled to a component that is movable relative to the body when driven by the first prime mover, but does not move the body;

(b) a processor that is electrically coupled to the first prime mover to control its operation;

(c) means for removably electrically coupling the processor to the computer to download a control program developed on the computer, said means for removably coupling being decoupled from the processor after the control program is downloaded;

(d) a battery power supply for the programmable toy that supplies electrical power to the first prime mover and to the processor;

(e) a memory associated with the processor, for storing the control program as it is downloaded from the computer through said means for removably electrically coupling, said processor responding to the control program stored in the memory to effect control of the first prime mover of the programmable toy, enabling the programmable toy to operate independently of the computer; and (f) a condition sensor that determines the voltage level of the battery power supply and produces an output signal indicative of said voltage level for input to the processor.

18. The programmable toy of claim 17, wherein the processor transfers a battery status signal to the computer when next coupled thereto.

* * * * *